LIQUID PHASE PROCESS FOR THE PRODUCTION OF N-ALKYL MORPHOLINES

Daniel R. Chisholm, Mount Vernon, N.Y., and Jack M. Solomon, West Caldwell, and Bernard Isbitsky, Paramus, N.J., assignors to Witco Chemical Corporation, New York, N.Y.
No Drawing. Filed Feb. 12, 1969, Ser. No. 798,761
Int. Cl. C07d 87/24
U.S. Cl. 260—247                    6 Claims

ABSTRACT OF THE DISCLOSURE

Long chain N-alkyl morpholines are prepared by a liquid phase process at atmospheric pressure by cyclodehydration of the corresponding N-substituted dialkanolamine in the presence of an activated alumina catalyst.

---

This invention relates to a novel catalytic liquid phase process for producing long chain N-aliphatic morpholines in high yields at atmospheric pressure in which activated alumina is utilized as a selective catalyst for cyclodehydrating long chain N-substituted dialkanolamines to produce the corresponding N-substituted morpholines.

The preparation of N-alkyl morpholines is known to the art, as is disclosed, for example, in U.S. Pat. No. 2,597,260, wherein N-aliphatic diethanolamines are converted by a dehydration catalyst such as aluminum oxide, chromium oxide, etc., to corresponding N-aliphatic morpholines in a vapor phase catalytic process, particularly at subatmospheric pressures; U.S. Pat. No. 3,151,113 wherein N-alkyl morpholines are prepared by reacting hydrogen, a diethylene ether and aliphatic alcohol at elevated temperatures and pressures in the presence of a suitable hydrogenation catalyst; and U.S. Pat. No. 3,155,656 wherein lower alkyl amines are reacted with bis(2-chloroalkyl) ethers to form N-substituted morpholines.

Generally speaking, the prior art techniques for preparing N-higher aliphatic morpholines by simple catalytic cyclization of N-higher aliphatic diethanolamines, as exemplified by U.S. Pat. No. 2,597,260, require vapor phase conditions and subatmospheric pressures to produce the N-higher aliphatic morpholine in economically advantageous yields. The higher temperatures required for vapor phase procedures are a disadvantage in that there is a serious risk of thermal decomposition both of reactant and product. Also, the inability to manufacture in economical yields at atmospheric pressures increases equipment cost. So far as we are aware, no satisfactory process has heretofore been known for producing long chain N-alkyl substituted morpholines in very high yields by simple liquid phase cyclodehydration of the correspondingly N-substituted dialkanolamine at atmospheric pressure.

In accordance with the present invention it has been discovered that N-substituted morpholines, in which the substituent contains from 8 to 18 carbon atoms, can be prepared by a liquid phase process at atmospheric pressure by passing a compound of the formula $$R'N(CH_2CHROH)_2$$

where R' represents an alkyl radical having from 8 to 18 carbon atoms, and wherein R is a member of the group consisting of hydrogen and $C_1$ to $C_4$ alkyl, over an activated alumina catalyst to effect cyclodehydration to the corresponding N-substituted morpholine. The reaction is represented by the following equation:

$$R'-N\begin{matrix}CH_2-CH-OH\\CH_2-CH-OH\\R\end{matrix} \longrightarrow R'-N\begin{matrix}CH_2-CH\\CH_2-CH\\R\end{matrix}O + H_2O$$

where R' and R represent the substituents described above.

Essential to the practice of the present invention is the utilization of an activated alumina catalyst, and, more particularly and advantageously, a high surface area activated alumina catalyst. Especially effective is such a catalyst having a surface area of the order of at least about 350 m.$^2$/g. and, better still, greater surface areas. While it is possible to carry out the cyclodehydration reaction using a lower surface area activated alumina catalyst, a much longer residence time of N-substituted dialkanolamine in the reaction zone is usually necessary, and the full economic advantages of our process will, accordingly, not be obtained because of the additional time required. One illustrative suitable commercially available activated alumina catalyst for the practice of the present invention is that sold as ⅛" spheres under the designation "H–151" (Aluminum Company of America) having the following properties: Surface area: 350 m.$^2$/gram; Composition: $Al_2O_3$ 86%, $Na_2O$ 1.0%, $Fe_2O_3$ 0.15%, $SiO_2$ 6.3%; Loss on ignition: 6.2% at 1100° C.; Sp.gr.: 3.1–3.3.

Although activated aluminas as such are highly effective as catalysts for the practice of our invention, it should be understood that said catalysts may contain minor amounts of catalyst modifiers without departing from the practice of the process of the present invention. Thus, by way of illustration, materials such as boric anhydride or calcium oxide may be added to or incorporated with the activated alumina and, in certain cases, the use of such modified catalysts may result in an increase of yield.

The N-substituted dialkanolamines which comprise the starting materials in the practice of the present invention are generally those wherein the N-substituent group is alkyl containing from 8 to 18 carbon atoms. Illustrative of such radicals which are attached to the dialkanolamine nitrogen are n-octyl, 2 ethyl-hexyl, diisobutyl, n-nonyl, di-isobutylcarbonyl, and normal as well as branched chain decyl, dodecyl, undecyl, tetradecyl, hexadecyl and octadecyl. The substituent group attached to the dialkanolamine nitrogen is most desirably unsubstituted alkyl and may be a mixture of alkyl groups, such as are usually produced when the source of the alkyl is a petroleum fraction containing paraffins of varying chain length such as are present in kerosenes. It has been found that activated alumina will effectively cyclodehydrate N-substituted dialkanolamines when the alkyl substituent is made up of a mixture of alkyl radicals of varying chain length to form the corresponding N-substituted morpholine derivative. Preferred starting materials of the latter type include those N-alkyl dialkanolamines in which the alkyl group is a normal paraffin having an average of about $C_{11.5}$.

Most advantageously the reactant will be an N-alkyl substituted dialkanolamine radical wherein the dialkanolamine radical is represented by the formula

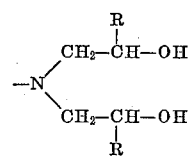

where R is any of hydrogen or $C_1$ to $C_4$ alkyl radicals, particularly preferred being those dialkanolamine radicals in which R is hydrogen or methyl. Thus a compound such as N-dodecyl-2,6-dimethyl morpholine may be prepared from the corresponding N-substituted dialkanolamine by simple cyclodehydration.

Especially suitable and preferred for use in the practice of the present invention are N-substituted diethanolamines wherein the substituent attached to the diethanolamine nitrogen is a straight chain alkyl containing from 12 to 16 carbon atoms, as exemplified by N-n-dodecyldiethanolamine and N-n-hexadecyldiethanolamine.

The reaction temperature may be varied within certain limits in practicing the process of the present invention but will generally fall within the range of about 150° C. to 285° C. Optimum temperature conditions are a function of the particular N-substituted dialkanolamine being reacted. With the higher molecular weight N-substituted dialkanolamines such as N-dodecyldiethanolamine, higher temperatures are preferred, i.e., about 285° C., but the temperature should be below that at which said compound vaporizes. For the production of the particularly preferred compounds, i.e., N-alkyl morpholines wherein the alkyl is n-$C_{12}$ to n-$C_{16}$, preferred temperature is about 260° C.–285° C. For the production of the lower molecular weight compounds, such as those in which the alkyl contains, say, 8 carbon atoms, the temperature should be lower so as to avoid vaporization and thermal decomposition.

The practice of the invention does not require the use of any particular apparatus. All that is required is a suitable means for passing the N-substituted dialkanolamine at the selected elevated reaction temperatures over the activated alumina catalyst. The liquid product is collected using conventional equipment. For best results a liquid hourly space velocity of 0.1 to 0.2 should be employed. An inert atmosphere may be employed to prevent unwanted side reactions but this is not critical to the practice of the present invention.

The invention is further illustrated but not limited by the following examples:

EXAMPLE I

N-dodecyldiethanolamine was heated to a temperature of 285° C. and passed into a 3 ft. x 25 mm. Vycor reactor tube containing about 175 cc. of activated alumina catalyst having a surface area of 350 m.²/g. The flow of reactant was maintained so as to provide a liquid hourly space velocity of 0.144 and the reaction was carried out at atmospheric pressure. N-dodecyl morpholine was collected in yields of 95 weight percent.

EXAMPLE II

Following the general procedure of Example I, dodecyl diisopropanolamine was converted to 4-dodecyl-2,6-dimethyl morpholine at 270° C., atmospheric pressure and using the catalyst of Example I.

What is claimed is:
1. A process for producing N-substituted morpholines of the general formula

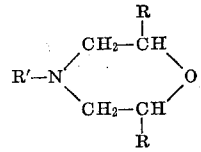

which comprises contacting an N-substituted dialkanolamine of the formula R'N(CH$_2$CHROH)$_2$ wherein R' represents an alkyl radical having from 8 to 18 carbon atoms and R is a member selected from the group consisting of hydrogen and $C_1$–$C_4$ alkyl radicals, in the liquid state with an activated alumina catalyst at atmospheric pressure and at a temperature of between about 150–285° C., to effect cyclodehydration of the N-substituted dialkanolamine, and recovering the N-substituted morpholine.

2. A process according to claim 1 where R is hydrogen.
3. A process according to claim 1 wherein the activated alumina catalyst has a surface area of at least about 350 m.²/g.
4. A process according to claim 6 wherein the cyclodehydration is carried out at a temperature of about 260° C. to 285° C.
5. A process according to claim 1 wherein R' represents dodecyl.
6. A process according to claim 5 wherein R represents methyl.

References Cited

UNITED STATES PATENTS 2,597,260    5/1952    Reck _____ 260—247

ALEX MAZEL, Primary Examiner

J. TOVAR, Assistant Examiner